United States Patent [19]

Colton

[11] Patent Number: 4,849,049

[45] Date of Patent: Jul. 18, 1989

[54] JOINING OF DISSIMILAR SURFACES BY QUASI-RANDOM ADHESIVE SPLATTER PATTERN

[75] Inventor: Douglas E. Colton, Salinas, Calif.

[73] Assignee: Slautterback Corporation, Monterey, Calif.

[21] Appl. No.: 84,295

[22] Filed: Aug. 11, 1987

Related U.S. Application Data

[63] Continuation-in-part of Ser. No. 36,802, Apr. 10, 1987, abandoned, which is a continuation-in-part of Ser. No. 863,088, May 14, 1986, Pat. No. 4,721,252.

[51] Int. Cl.[4] .......... B32B 7/14

[52] U.S. Cl. .......... 156/291; 427/256; 427/422; 427/424; 239/8; 118/313; 264/13

[58] Field of Search .......... 427/422, 424, 208.2, 427/256; 118/313, 315, 411, DIG. 16; 604/366; 156/291, 167, 324, 74; 239/8; 264/13; 425/7, 8

[56] References Cited

U.S. PATENT DOCUMENTS

| | | | |
|---|---|---|---|
| 2,411,660 | 11/1946 | Manning | 156/167 |
| 2,551,538 | 5/1951 | Hensel | 239/424 |
| 3,348,520 | 10/1967 | Lockwood | 118/2 |
| 3,406,905 | 10/1968 | Reilly et al. | 239/84 |
| 3,676,242 | 7/1972 | Prentice | 156/167 X |
| 3,849,241 | 11/1974 | Butin et al. | 156/167 X |
| 4,031,854 | 6/1977 | Sprague, Jr. | 118/641 |
| 4,065,057 | 12/1977 | Durmann | 239/79 |
| 4,069,822 | 1/1978 | Buell | 604/366 |
| 4,100,324 | 7/1978 | Anderson et al. | 156/167 X |
| 4,573,986 | 3/1986 | Minetola et al. | 604/366 |
| 4,636,425 | 1/1987 | Johnson et al. | 427/208.2 X |
| 4,753,649 | 6/1988 | Pazdernik | 604/389 |

OTHER PUBLICATIONS

"Adhesives and Coating Manual", National Distillers and Chemical Manual, pp. 15-18.

Wente, Var A., "Superfine Thermoplastics", *Industrial and Engineering Chemistry,* vol. 48, No. 8 (1956) pp. 1342-1346.

*Primary Examiner*—Michael W. Ball
*Assistant Examiner*—Jeff H. Aftergut
*Attorney, Agent, or Firm*—Thomas Schneck

[57] ABSTRACT

A method of adhesively joining a woven material to a nonwoven, heat liquefacient material in a pattern of quasi-random irregular webs splattered onto one material. The webs range from droplets to an interlinking filaments and surface coverage is in a stripe pattern having a quasi-random coverage feature wherein there is a more than likely probability of encountering a droplet or filament along any line parallel to the stripe direction within a distance less than the width of the stripe.

8 Claims, 5 Drawing Sheets

JOINING OF DISSIMILAR SURFACES BY QUASI-RANDOM ADHESIVE SPLATTER PATTERN

CROSS-REFERENCE TO RELATED APPLICATIONS

This application is a continuation-in-part of prior copending application Ser. No. 036,802, filed Apr. 10, 1987 now abandoned, which is a continuation-in-part of prior copending application Ser. No. 863,088, filed May 14, 1986, now U.S. Pat. No. 4,721,252.

TECHNICAL FIELD

The present invention relates to the dispensing of viscous thermoplastic adhesive materials and in particular to a method of joining two surfaces, one woven and one nonwoven, with hot-melt adhesive material and the like, and an article formed by use of the method.

BACKGROUND ART

It is known that hot-melt adhesives may be used to join woven materials to nonwoven materials, such as the fibrous material of a disposable diaper lining to its smooth plastic casing. Typically, hot-melt adhesive is applied to a plastic diaper casing in a series of parallel continuous strips by a high pressure applicator.

While the application of hot-melt in continuous strips provides adequate bonding strength for most uses, such application has certain problems. First, the continuous strips represent a considerable use of adhesive material. And since a significant portion of the adhesive does not actually contact either the woven material or the nonwoven material, but instead solidifies within the interior of the strips, much of the adhesive does little to add to bonding strength. Of course, additional strips will increase the strength of the bond, but the additional strips will require an even greater use of adhesive.

Furthermore, continuous strips form channels and dams which prevent the free passage of liquid. Again using a disposable diaper as an example, the joinder of the polypropylene to the diaper lining along a strip hinders the side-to-side flow of liquid and tends to channel liquid forwardly or, more commonly, rearwardly out of the diaper. The problem is compounded because the mass of the adhesive maintains the temperature and will cause some plastic materials, such as polypropylene, to melt somewhat during application. Pucker lines are obvious on most disposable diapers and will increase the chances of liquid channeling, while simultaneously decreasing the bonding strength between the two materials.

One solution to some of the problems is to produce a series of regular, linear, short dots and dashes instead of a continuous strip. In U.S. Pat. No. 3,348,520, Lockwood discloses an apparatus which produces linear dots and extended dashes of hot-melt by opening and closing valves in nozzles at a high cycling rate. Valves in the dispensing head are responsive to the alternating high pressure stroke and suction stroke of a pump. The valve in each nozzle also ensures clean sharp closure of the nozzles, thereby preventing any tendency towards dripping. However, while the linear dots and extending dashes do reduce the amount of adhesive needed per application, puckering of the diaper remains a problem since the mass of adhesive at a particular locality of application remains the same. Additionally, the use of high pressure to force hot-melt through nozzle orifices presents an occupational risk and requires expensive hoses and fittings, as a rupture in the equipment could spray hot material in any direction. Moreover, to prevent excessive adhesive flow during high pressure applications, nozzle orifices must be dimensionally small, thereby leading to maintenance problems since a reduction in the size of nozzle orifices often results in a greater frequency of plugged nozzles.

It is an object of the present invention to provide a method for joining a woven material to a nonwoven material, using hot-melt adhesives, which operates at low pressures and which results in a considerable saving of the amount of hot-melt adhesive used. It is a further object to provide such a method which produces a product which is without pucker lines and which has considerably more strength of bond.

DISCLOSURE OF THE INVENTION

The above objects have been met with a hot-melt adhesive dispensing method which sputters hot-melt adhesive, sometimes referred to as "hot-melt", onto surfaces at very close range. The method involves deposition of a quasi-random pattern of hot-melt over a surface. The deposition is in the form of an irregular interlinked web pattern with anywhere from 15% to 75% of the distance along any line through a stripe being covered by adhesive, each line measured having a different hot-melt distribution from every other line.

The method is used in adhesively joining a woven material to a nonwoven material. A stream of hot-melt adhesive is directed toward a first surface which is preferably the nonwoven material. The stream is broken up into an irregular web by a gas stream interacting with a nozzle in an irregular way. "Web" is meant to include a filamentary pattern of sometimes overlapping strands of varying length, width and thickness with droplets among the strands. Airborne filaments, which cannot be controlled, termed "angel hair", are undesirable. Because the desired pattern is maintained within a range, the interlinked web pattern is not completely random, but quasi-random.

The quasi-random pattern provides a substantial savings over an areawide coverage or a dot-dash pattern. By positioning a plurality of patterned stripes contiguously, areawide coverage of a surface is possible without coating an entire surface with adhesive. Thus, a stronger bond is provided in comparison to parallel continuous or dot-dash strips that are spaced apart by areas void of adhesive. Yet, the stronger bond is accomplished with a savings in adhesive, given a comparable number of stripes and continuous strips.

Moreover, because the quasi-random pattern of adhesive is applied at a very close range, as close as one inch from the application surface, the premelted adhesive may be maintained at a temperature which is less likely to melt a heat liquefacient material. The polypropylene casing of a disposable diaper will not, therefore, either melt to weaken the bonding of the materials or form pucker lines which act as channels and dams to inhibit the free flow of liquid across the diaper lining. Control of surface melting is furthered since the mass of adhesive associated with a particular area is relatively small. Additionally, in the preferred embodiment the hot-melt is broken up by injection of a gas stream axially parallel to a hot-melt stream at or within the nozzle. Thus, the gas stream will further cool the adhesive before the adhesive reaches the surface. Since, most bonding of a nonwoven material to a woven material is accomplished with a pressure sensitive adhesive, rather than a wax based adhesive, the cooling that takes place within this short distance is not detrimental.

BEST MODE FOR CARRYING OUT THE INVENTION

The present invention involving sputter deposition of hot-melt adhesive material requires that a fluid stream of hot-melt adhesive be directed toward a first surface and be broken up into an irregular pattern of interlinking webs. The hot-melt itself is typically a pressure sensitive adhesive. That is, the adhesive will remain tacky after cooling, rather than cooling to form a bond. The use of a pressure sensitive adhesive, however, is not required. A nozzle is usually used to direct the fluid stream toward a first surface. The nozzle contains separate streams of gas, under slight pressure, and hot-melt adhesive. The function of the gas is to break up the fluid stream without causing gas to be introduced into the adhesive. If the gas is introduced into the adhesive, undesirable foaming may result, causing a loss in the desired adhesive properties. The gas must be used against the fluid stream in a manner which causes the formation of irregular sized droplets and filaments. It is intended that the fluid stream directed toward a target surface provide areawide coverage in a quasi-random interlinking web pattern. For example, in a stripe pattern if a line is drawn anywhere within the stripe and parallel to the stripe direction, one should encounter adhesive within a distance less than the width of the stripe.

Figure 1:
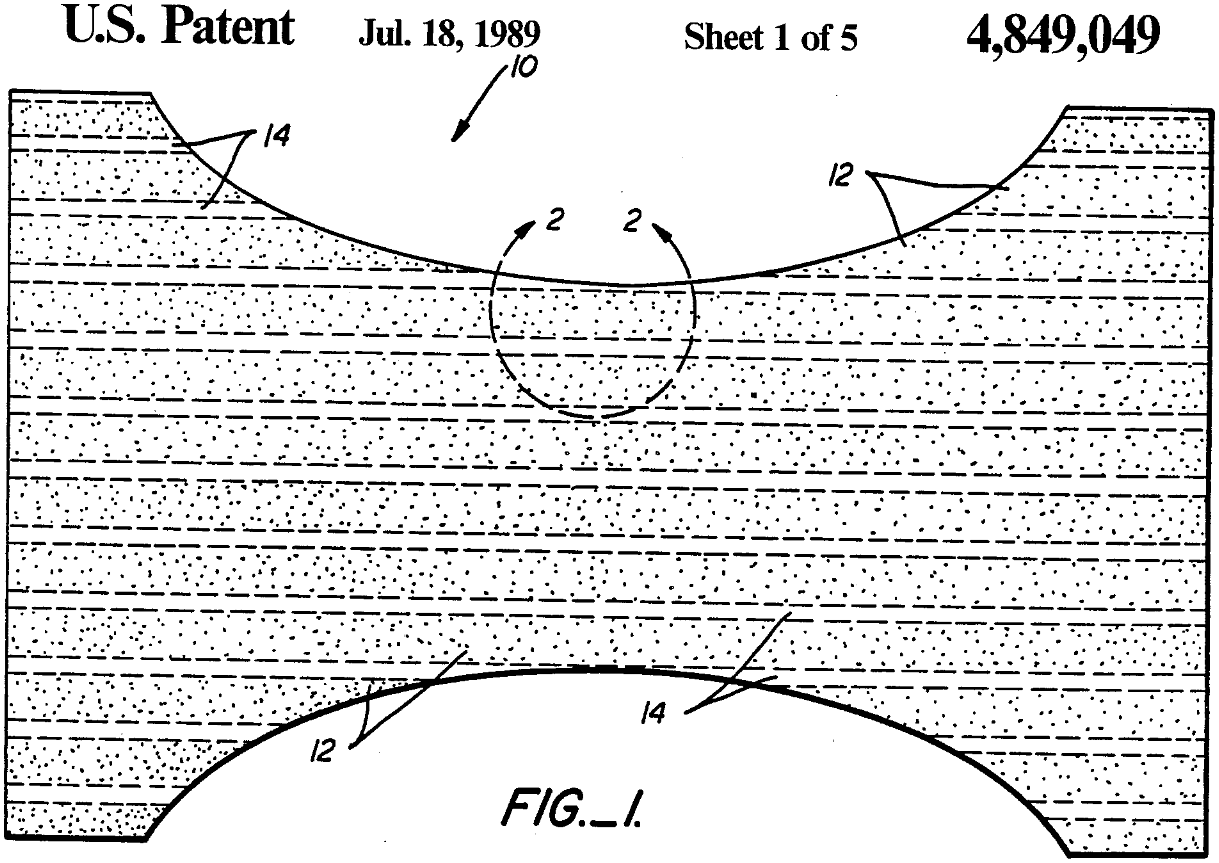
FIG. 1 is a top view of a first embodiment of a diaper having received adhesive in accordance with the method of the present invention.

With reference to FIG. 1, a diaper casing 10 is shown having a nonwoven surface which has received twelve parallel stripes 12 of hot-melt adhesive. The stripes 12 of adhesive are spaced apart by void areas 14. The number of stripes is not critical. It is contemplated to use as many as twenty-four nozzles to apply adhesive to a diaper casing 10.

Figure 2:
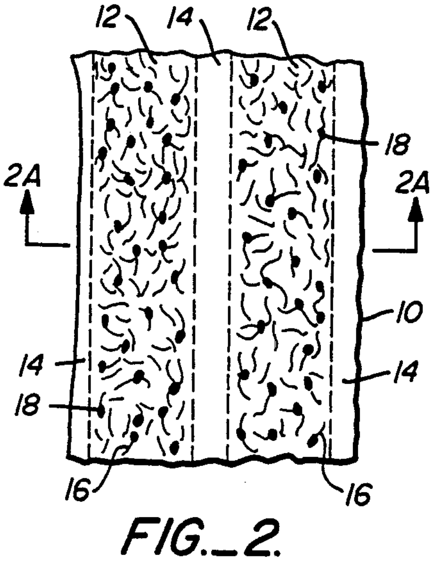
FIG. 2 is an expanded view of the diaper of FIG. 1 taken along lines 2—2.

The magnified view of FIG. 2 illustrates that the hot-melt adhesive in a stripe 12 is disposed in an irregular interlinking web pattern of filaments 16 and droplets 18. The filaments 16 must have sufficient mass to maintain a projection path from a nozzle to a diaper casing. At some point isolated airborne filaments become so fine that they will float with a current of air. This occurrence of "angel hair" is to be avoided. Extremely fine filaments are possible without the occurrence of "angel hair" only if the adhesive is applied with a nozzle system which permits adhesive application within a range of a few inches or less. The nozzle system to be explained below allows application within a range as close as one inch from the application surface.

Figure 3:
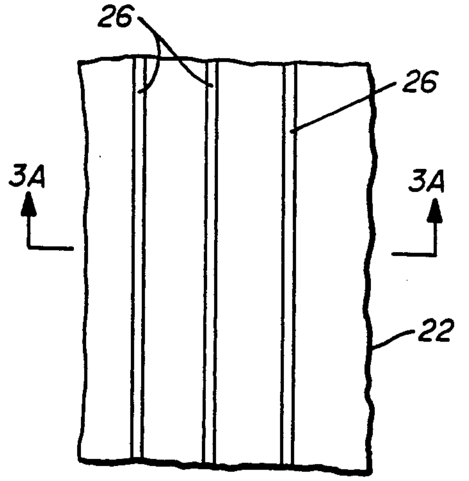
FIG. 3. (PRIOR ART)
FIGS. 3 and 3A are representative of a diaper having received adhesive in accordance with the prior art method.
Figure 2A:
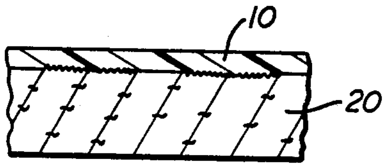
FIG. 2A is a side sectional view of a diaper of FIG. 2 taken along lines 2A—2A.
Figure 3A:
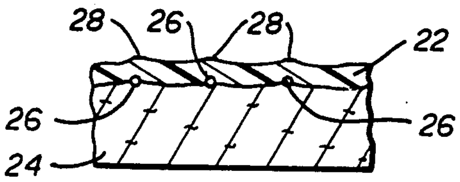
FIG. 3A. (PRIOR ART)

As may be seen in FIG. 2A, a diaper lining 20 is brought into pressure contact with the adhesive on the polypropylene diaper casing 10. The diaper casing experiences a negligible amount of melting since any given area of the diaper casing comes into contact with only a relative small mass of adhesive. In comparison, FIGS. 3 and 3A illustrate a hot-melt adhesive application that is representative of the prior art method of bonding a woven material 22 to a nonwoven material 24. Typically, adhesive is disposed in a series of parallel continuous strips 26. Again using a disposable diaper as an example, the diaper casing 22 is generally made of polypropylene or some other heat liquefacient material and the mass of the heated adhesive strips 26 will therefore cause melting. The melting produces pucker lines 28 which are visible at the exterior of a disposable diaper.

After the parallel strips 26 have been applied in accordance with the prior art method, a diaper lining 24 is brought into contact with the diaper casing 22. As shown in FIG. 3A, the force of the diaper lining 24 does not significantly compress the strips of adhesive and the adhesive therefore dries in a bead-like cross section. Thus, much of the adhesive that is used contacts neither the diaper casing nor the diaper lining and, consequently, adds very little to the strength of the bond between the two materials. A strong bond is further inhibited by the casing liquefaction that occurs during formation of the pucker lines 28. Another problem which arises with application of adhesive in parallel strips is that the strips will act as channels and dams for the flow of liquid. As a consequence, there is an increased chance of liquid collecting within an area void of adhesive, and then flowing along the void area to the front or rear of a diaper.

Returning briefly to FIGS. 2 and 2A, the irregular interlinking web pattern of the present invention permits liquid flow from a void area 14 into the stripes 12 of filaments 16 and droplets 18. Thus, there is little chance of liquid being channeled along a void area. Moreover, because the adhesive is applied at a distance of as close as one inch, the adhesive may be kept at a relatively low temperature which, in conjunction with the small mass of the filaments 16 and droplets 18, prevents pucker lines in the diaper casing 10. The ratio of adhesive contacting the diaper materials 10 and 20 to the amount of adhesive applied has, therefore, been substantially increased so as to provide a stronger bond without increasing the amount of adhesive.

Figure 4:
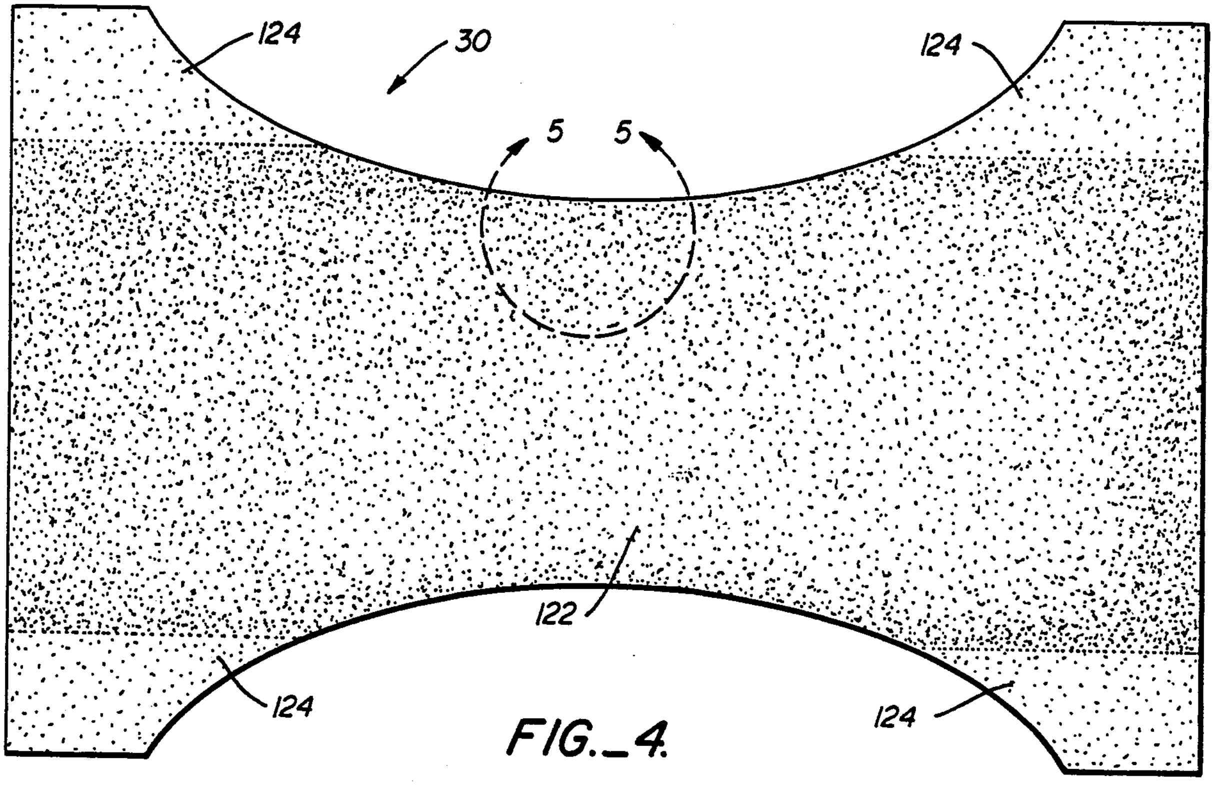
FIGS. 4–5A show a second embodiment of a diaper having received adhesive in accordance with the method of the present invention. acoord with the present invention.
Figure 5:
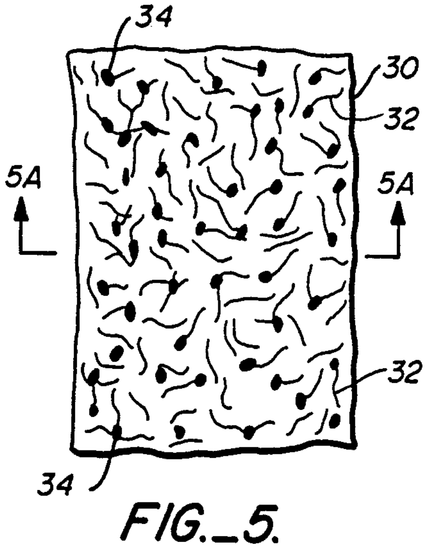
Figure 5A:
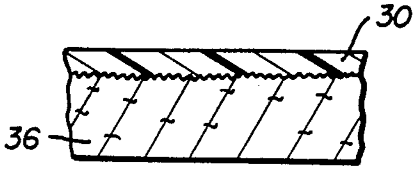

Referring now to FIGS. 4–5A, a diaper casing 30 having full coverage is shown. Increased coverage is most easily obtained by increasing the number of application nozzles. As will be discussed more fully below in reference to FIG. 16, the web pattern of an adhesive stripe is only quasi-random in that the pattern may be controlled to some degree by controlling the pressures of the gas stream and the stream of adhesive and by controlling the viscosity of the hot-melt adhesive. An increased gas pressure will result in greater gas expansion at a nozzle outlet, resulting in stripes having a greater width and frequency of filaments 32, with a corresponding decrease in droplets 34. Again, airborne filaments so fine that they will float with a current of air are to be avoided. The positioning of a nozzle relative to a worksurface is an important factor in this regard.

An increase in the flow of hot-melt material will cause a greater frequency of droplets 34, all other factors remaining the same. Conversely, an increase in dispensing temperature will create a greater frequency of filaments 32. The web pattern may, therefore, be adjusted as desired, depending upon the application. When heat liquefacient material, such as a polypropylene diaper casing 30, makes up one surface, the temperature of the adhesive as it reaches the material must be controlled to minimize melting of the material. After application of the adhesive, a diaper lining 36 is brought into pressure contact with the diaper casing 30.

Figure 6:
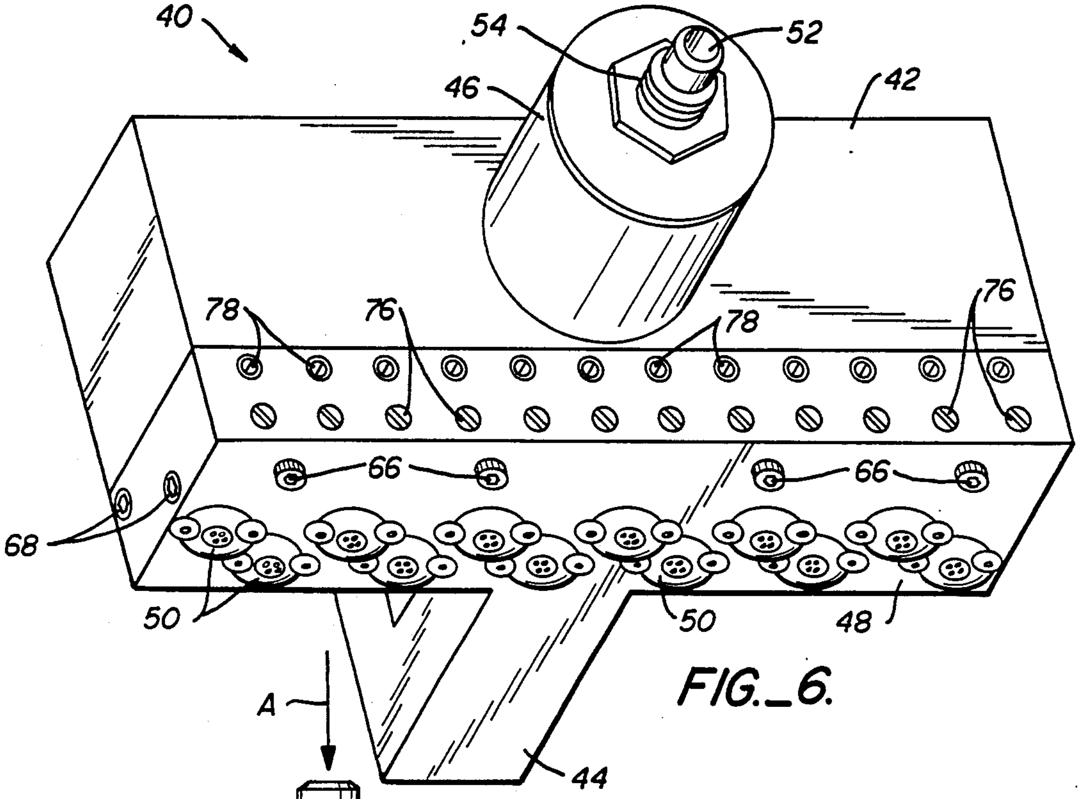
FIG. 6 is a perspective view showing exemplary apparatus employed in carrying out the method of the present invention.
Figure 7:
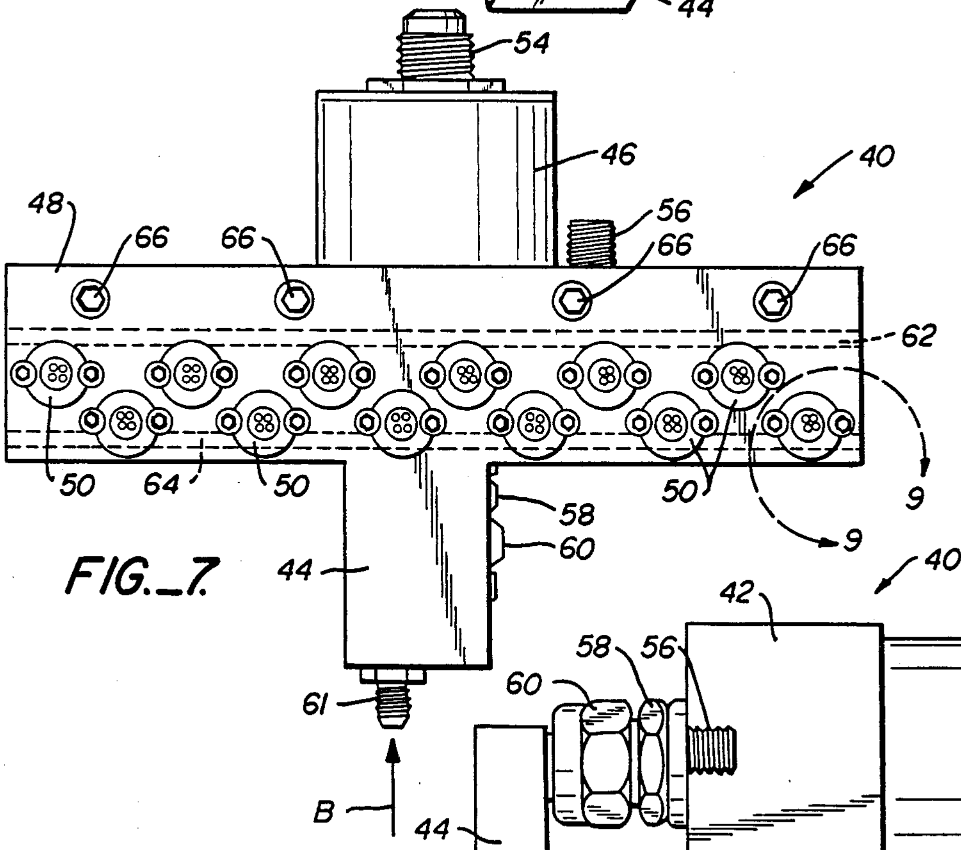
FIG. 7 is a bottom view of a nozzle manifold shown in FIG. 6.
Figure 8:
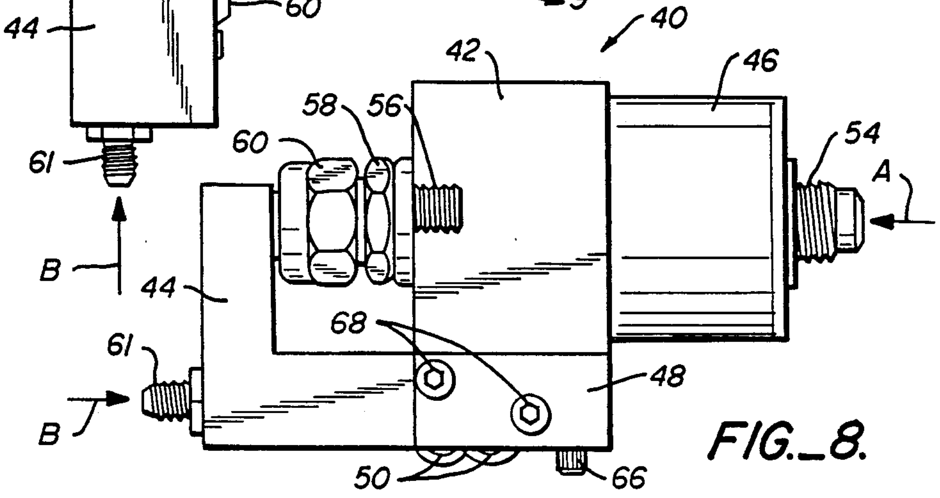
FIG. 8 is an side view of the nozzle manifold of FIG. 7.

With reference to FIGS. 6–8, a nozzle manifold 40 for application of hot-melt adhesive includes a heater body 42, an L-shaped material transfer block 44, a solenoid valve 46 and a rectangularly shaped dispenser bar 48. Hot-melt adhesive is sprayed from nozzles 50 of the dispenser bar 48.

Hot-melt adhesive enters the nozzle manifold 40 through an axial bore 52 in the externally-threaded shaft 54 of the solenoid valve 46, as shown by Arrows A. Typically, hot-melt adhesive is supplied from a melting tank, not shown, through hoses coupled to the threads of shaft 54. The solenoid valve 46 is controlled through power lines in conduit 56 to selectively permit passage of adhesive to the heater body 42.

The heater body 42 includes a pair of 500 watt heaters, not shown, which maintain hot-melt adhesive in a molten condition during passage through the nozzle manifold 40. Power lines in conduit 56 provide power to the heaters.

After progressing through the solenoid valve 46 and the heater body 42, adhesive enters a coupling assembly having a pair of swivel nuts 58 and 60 for passage to the L-shaped material transfer block 44. The coupling assembly places the material transfer block 44 in a direct hot-melt material dispensing line with the heater body 42. The swivel nuts 58 and 60 allow tolerances for a leak-free attachment of the heater body 42 to the material transfer block 44.

A stream of gas is injected into the nozzle manifold 40 at the elbow of the L-shaped material transfer block 44, as indicated by Arrows B. A source of gas, preferably air, is coupled to the externally threaded gas input shaft 61. The rectangularly shaped dispenser bar 48 is in adhesive and gas transfer relation with the material transfer block 44 so that hot-melt adhesive is passed to a first longitudinal bore 62 and the stream of gas is passed to a second longitudinal bore 64 in the dispenser bar 48. As will be shown below, each nozzle 50 is in fluid communication with both the first and the second longitudinal bores 62 and 64.

The heater body 42 conducts heat to the dispenser bar 48 indirectly through the material transfer block 44 and directly by means of frictional contact with the dispenser bar. The dispenser bar 48 is secured to the heater body 42 by four hex-head screws 66 which penetrate the dispenser bar. The heater body is made of a metallic material and should be sufficiently massive and thermally conductive to maintain the temperature of the nozzles 50 with a temperature drop, relative to that of the adhesive entering the nozzle manifold 40, of 40°–50° F.

Thus, hot-melt adhesive enters the nozzle manifold 40 at the externally threaded shaft 54 of the solenoid valve 46, whereafter the adhesive passes through the heater body 42 to the material transfer block 44 and, finally, to the first longitudinal bore 62 of the dispenser bar 48. The stream of gas, in comparison, is injected into the gas input shaft 61 of the material transfer block 44 and follows a path adjacent to the path of the molten adhesive to the second longitudinal bore 64. In this manner, the stream of gas is heated prior to contact with the hot-melt at the nozzle outlets. To facilitate cleaning of the longitudinal bores 62 and 64, removable bolts 68 are secured by internal threads at the opposed ends of each longitudinal bore.

Figure 9:
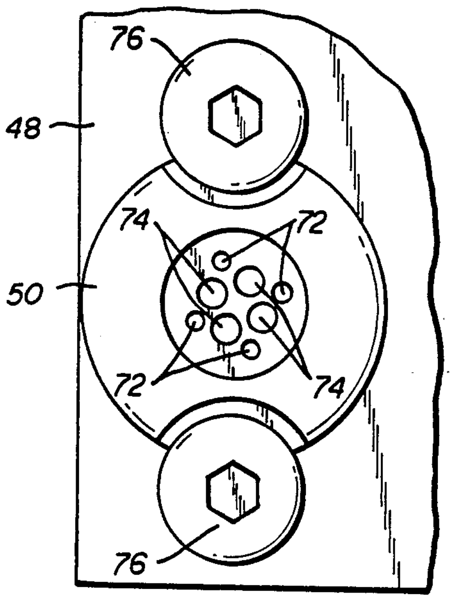
FIG. 9 is a bottom view of a nozzle taken within line 9—9 of FIG. 8.

FIG. 9 is a magnified bottom view of a nozzle 50 secured to the dispenser bar 48 by hex-head screws 70. Each nozzle has a square array of hot-melt material passageways 72 surrounding a square array of gas outlets 74. As shown in FIG. 7, the dispenser bar 48 includes twelve nozzles 50 staggered between two rows. Each material passageway 72 of a nozzle 50 is in fluid communication with the first longitudinal bore 62, while each gas outlet 74 is in fluid communication with the second longitudinal bore 64. Each nozzle 50 is associated with a slotted material adjustment screw 76 and a hex-head gas adjustment screw 78. The material adjustment screw 76 may be utilized to increase or decrease the adhesive extruded from a particular nozzle 50. Likewise, a gas adjustment screw 78 will restrict fluid contact between the second longitudinal bore 64 and an associated nozzle 50, thereby controlling the flow of gas from the nozzle.

The dispenser bar 48 of FIGS. 6–9 is approximately six inches in length. It is to be understood that the length of the dispenser bar and the number of nozzles 50 secured to the dispenser bar are not critical. Nor is the number or configuration of the material passageways 72 and gas outlets. Also, a plurality of nozzle manifolds 40 may be employed in a single application. For example, two dispenser bars 48 may be utilized to provide the twelve inches of coverage required for a disposable diaper.

Figure 10:
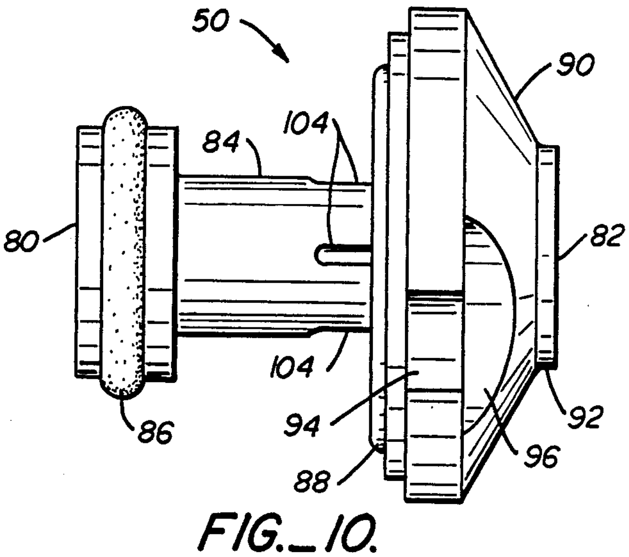
FIG. 10 is a side view of the nozzle of FIG. 9.
Figure 11:
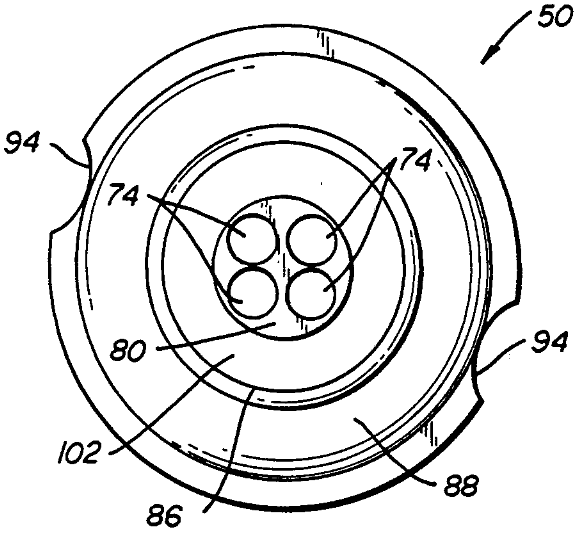
FIG. 11 is a rear view of the nozzle of FIG. 10.
Figure 12:
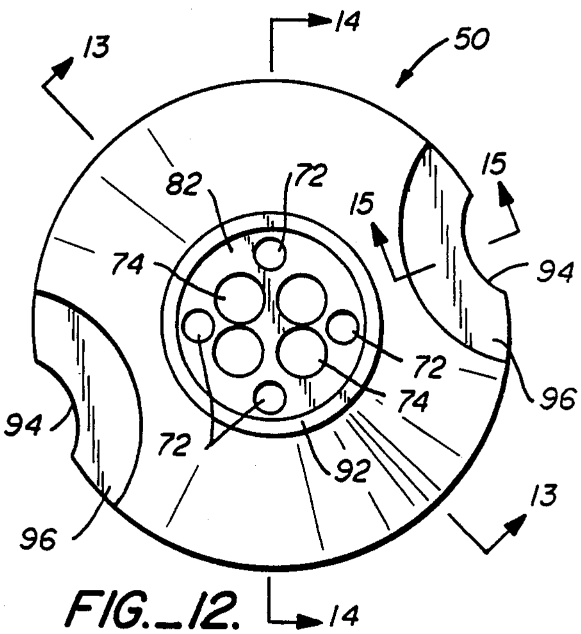
FIG. 12 is a front view of the nozzle of FIG. 10.

With reference to FIGS. 10–12, each nozzle 50 has an inlet end 80, a dispensing end 82, and a tubular midportion 84. The nozzle has a one-piece construction, other than a rear O-ring 86 and a forward O-ring 88 which are employed to seal the nozzle 50.

The dispensing end 82 of the nozzle 50 has a frustroconically sloped surface 90 which terminates in a short, cylindrical projection 92 in order to lessen the possibility of hot-melt material adhering to the dispensing end. While the invention is discussed with reference to spraying hot-melt material, other thermoplastics and fluid could be similarly used. As noted above, each nozzle 50 is secured to the dispensing bar by two hex-head screws. For this reason, the nozzle has notches 94 which provide clearance for the threads of a screw, and the dispensing end 82 has indentations 96 for acceptance of the head of a screw.

Figure 13:
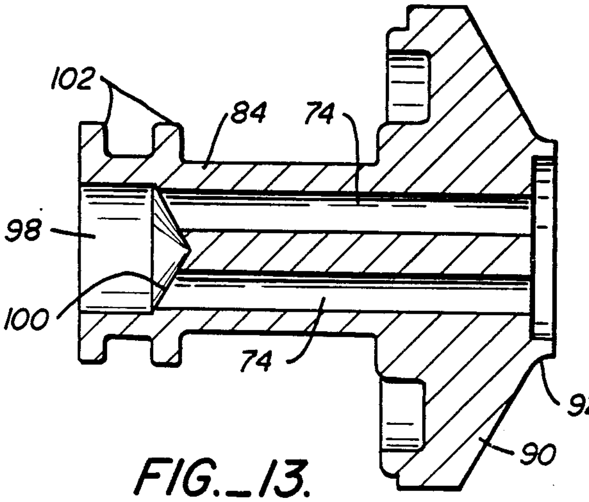
FIG. 13 is a sectional view of the nozzle of FIG. 12 taken along lines 13—13.

Referring now to FIGS. 11–13, the nozzle 50 has a gas flow path that is comprised of an inlet section 98 and a square array of four gas outlets 74. A stream of gas, preferably air, may be fed into the inlet section 98 for projection from the dispensing end 82 of the nozzle. The inlet section 98 has a conical extremity 100 leading to the connection of the inlet section with the gas outlets 74. Because the aggregate cross-sectional area of the gas outlets 74 is less than the cross-sectional area of the inlet section 98, the velocity of a given stream of gas will be increased as the stream of gas enters the outlet sections. Typically, the inlet section has a diameter of 0.12 inches and the outlet sections each have a diameter of 0.043 inches. This feature is not critical to proper operations of the nozzle, but the acceleration of the gas stream does aid in minimizing the required gas pressure that must be supplied to a nozzle in order to obtain the desired result.

The inlet end 80 of a nozzle includes a pair of flanges 102. The O-ring 86 is fitted between the flanges 102.

Figure 14:
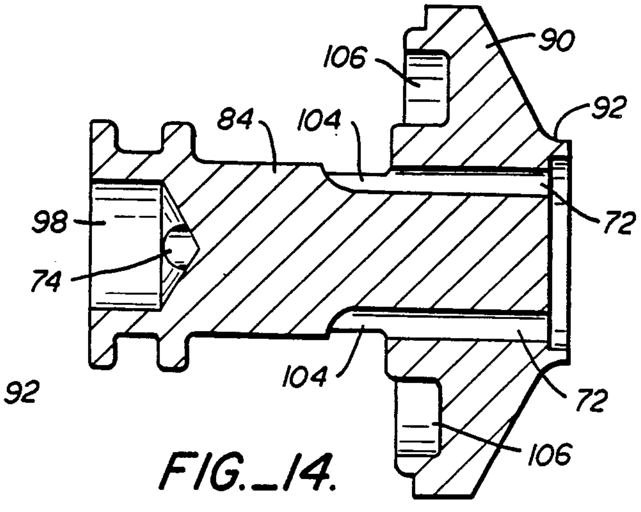
FIG. 14 is a sectional view of the nozzle of FIG. 12 taken along lines 14—14.

FIGS. 10, 12 and 14 illustrate a hot-melt material flow path. The midportion 84 of the nozzle 50 has openings 104 which lead to a square array of four material passageways 72 that is offset from the square array of gas outlets 74 by forty-five degrees. While a square array is preferred, other geometrically regular arrays will work, such as at corners of a regular triangle or a regular pentagon. Each material passageway 72 is equidistant from a pair of adjacent outlets 74 of the gas flow path. As hot-melt material is extruded from the material passageways 72, the expansion of the gas from the gas outlets 74 will force the hot-melt stream from each passageway outwardly, thereby producing a series of beads or droplets of hot-melt adhesive material.

Figures 15, 16:
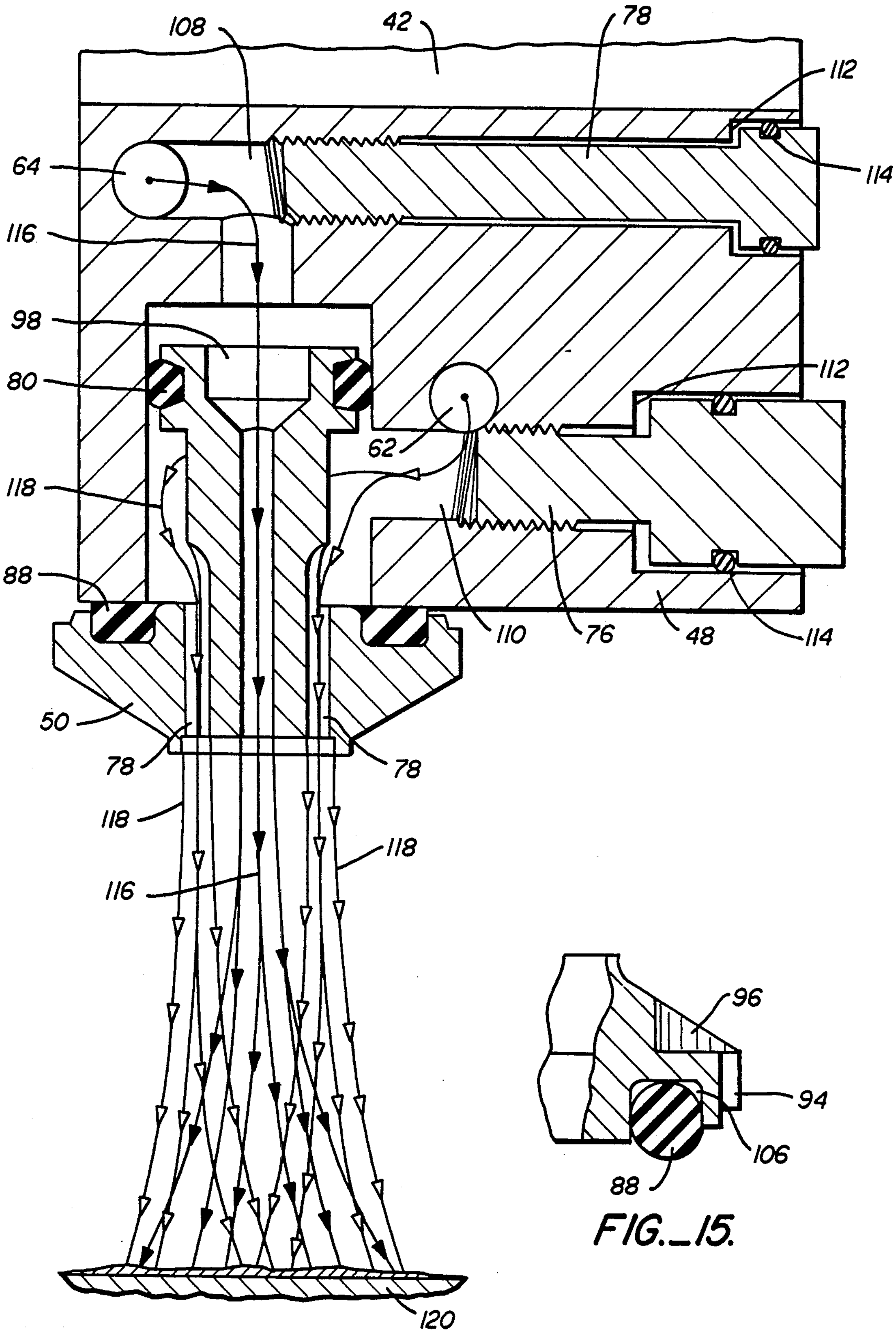
FIG. 15 is a partial sectional view of the nozzle of FIG. 12 taken along lines 15—15.
FIG. 16 is an operational view of the nozzle manifold of FIG. 1.

Referring now to FIGS. 14–16, the forward O-ring 88 is positioned within an annular slot 106. The O-ring seals the nozzle 50 so that hot-melt material will not flow from the edges of the nozzle which is secured to the dispenser bar 48. An internally threaded flow passage bore 108 in the dispenser bar 48 receives the threshold end of gas adjustment screw 78. The internally threaded bore 108 joins the second longitudinal bore 64 of the dispenser bar 48 for fluid communication with the inlet section 98 of the nozzle. Thus, rotation of the gas adjustment screw 78 will vary the opening between second longitudinal bore and the nozzle, thereby regulating the gas pressure at the nozzle. Similarly, the threaded end of the material adjustment screw 76 is received in a threaded flow passage bore 110 which links the first longitudinal bore 62 to the material passageways 72 of the nozzle. Rotation of the material adjustment screw 76 will therefore regulate the flow of hot-melt adhesive through the nozzle 50. A method of regulating hot-melt adhesive flow and gas pressure at individual nozzles is especially important in applications having a great number of nozzles, since pressure will decrease after material and gas are dispensed through each succeeding nozzle. Each bore 108 and llo has a shoulder 112 and each adjustment screw 76 and 78 has an O-ring 114 sealing the bores to prevent leakage.

In operation, the gas flow path 116 in an inner flow path. That is, the gas flow through the nozzle is surrounded by the outer, hot-melt flow path 118. Upon exit from the nozzle 50 the stream of gas will begin to expand. Because the gas flow path is axially inward, the stream of material from the nozzle will be dispersed axially outward. As a result, the hot-melt material will be deposited upon a work surface 120, such as a diaper casing, in the form of an irregular interlinked web pattern.

Referring now to FIGS. 4 and 16, the diaper casing 30 of FIG. 4 is shown to have a heavier coverage toward the center 122 than at the opposed ends 124 of the diaper casing. As noted above, the amount of adhesive flow from each nozzle may be regulated by the position of the material adjustment screw 76 relative to the longitudinal bore 62 of the dispenser bar 48. Thus, it is possible to vary the adhesive output of individual nozzles of a multi-nozzle dispenser bar.

The position of a material adjustment screw 76 will also affect the characteristics of the interlinking web pattern of the adhesive stripe provided by a nozzle 50. The web pattern is not random, but rather qussi-random, since the pattern can be controlled to some degree by various factors. The positioning of the material adjustment screw 76, for example, will provide more of the droplet pattern of FIG. 2, and less of the filament pattern of FIG. 5, as a nozzle is caused to extrude an increased volume of adhesive. As the volume is increased the gas stream will be less effective in breaking up the stream of hot-melt material into filaments.

It follows that an increase in the pressure of the gas stream provides a more filamentary web pattern, since the expansion of the gas stream at the outlet of a nozzle 50 will have a greater force. That is, the position of the gas adjustment screw 78 relative to the longiudinal bore 64 affects the type of web pattern produced by a nozzle. Additionally, the viscosity of the adhesive influences the ratio of filaments to droplets in a web pattern. An increase in dispensing temperature creates a greater frequency of filaments.

Finally, as the spacing between a nozzle and a work-surface is extended, the filaments which make up the irregular interlinking web pattern become finer. At some point, however, isolated arborne filaments become so fine that the filaments float with a current of air. This occurrence of "angel hair" is to be avoided.

Nozzles 50 operate at low pressure, with hot-melt being at a pressure less than 150 pounds per square inch and the gas stream being at a pressure less than ten pounds per square inch. Low pressure gas supply is possible since the gas flow path is an inner flow path. Additionally, because the gas flow path is through the dispensing bar 48, the gas is heated, thereby reducing the possibility of the gas significantly cooling the hot-melt adhesive before the material reaches the application surface.

I claim:

1. A method of joining two surface comprising, directing a fluid flow stream of hot-melt adhesive towards a first surface, said first surface being one of the two of a woven material and a nonwoven material, breaking said fluid stream into irregular on-the-fly webs of filaments and droplets, covering at least a portion of said first surface with a stripe of webs in the form of a quasi-ramdom splatter pattern of irregular filaments and droplets, said hot-melt filaments and droplets distributed in said pattern such that on a straight line through the pattern the hot-melt adhesive occupies between 15% and 75% of the distance along the line and voids occupy the remainder, and bringing a second surface into pressure contact with said first surface, said second surface being a remaining one of the two of a woven material and a nonwoven material, relative to said first surface.

2. The method of claim 1 wherein said webs are formed on-the-fly by releasing a gas stream axially parallel to and within said fluid stream.

3. The method of claim 1 wherein said first surface is a polypropylene material.

4. The method of claim 1 wherein said hot-melt adhesive is a pressure-sensitive adhesive.

5. A method of joining two surfaces comprising, forming a flowable stream of hot-melt adhesive within a dispenser having a nozzle, aiming said nozzle at a first surface made of a nonwoven material, breaking up said flowable stream into airborne irregularly shaped droplets and filaments at said nozzle, the irregular shape of the droplets and filaments striking said first surface in an interlocking web pattern of adhesive strands of varying length, width and thickness with droplets among the strands, and contacting a second surface with said first surface, said second surface being a woven material.

6. The method of claim 5 wherein said stream of hot-melt adhesive is broken by expanding a gas stream axially parallel to and within the stream of hot-melt adhesive.

7. The method of claim 5 wherein said nonwoven material is polypropylene and said woven material is diaper lining material.

8. A method of adhesively joining two surfaces comprising, dispensing in an airborne manner a splatter pattern of molten hot-melt adhesive globules and filaments on a first surface in a stripe having a length and a width, the pattern having a quasi-random distribution of globules and connecting irregularly dimensioned filaments such that the droplets and filaments form an interlocking web pattern with a probability of encountering adhesive material in a direction parallel to the stripe direction in a distance less than the width of the stripe being more likely than not, and bringing a second surface into pressure contact with the stripe while said globules and filaments are still molten.

* * * * *

UNITED STATES PATENT AND TRADEMARK OFFICE
CERTIFICATE OF CORRECTION

PATENT NO. : 4,849,049

DATED : July 18, 1989

INVENTOR(S) : Douglas E. Colton

It is certified that error appears in the above-identified patent and that said Letters Patent is hereby corrected as shown below:

Column 7, line 62 "llo" should read - - 110 - -.

Column 8, line 19 "qussi-random" should read - - quasi-random - -.

Claim 5, column 9, line 23 "interlocking" should read - - interlinking - -.

Claim 8, column 10, line 18, "interlocking" should read - - interlinking - -.

Signed and Sealed this

Second Day of October, 1990

Attest:

HARRY F. MANBECK, JR.

*Attesting Officer* *Commissioner of Patents and Trademarks*